(12) United States Patent
Ebrahimi Afrouzi et al.

(10) Patent No.: US 11,360,481 B1
(45) Date of Patent: Jun. 14, 2022

(54) SURFACE COVERAGE OPTIMIZATION METHOD FOR MOBILE ROBOTIC DEVICES

(71) Applicants: Ali Ebrahimi Afrouzi, San Diego, CA (US); Soroush Mehrnia, Helsingborg (SE); Sebastian Schweigert, Sunnyvale, CA (US)

(72) Inventors: Ali Ebrahimi Afrouzi, San Diego, CA (US); Soroush Mehrnia, Helsingborg (SE); Sebastian Schweigert, Sunnyvale, CA (US)

(73) Assignee: AI Incorporated, Toronto (CA)

( * ) Notice: Subject to any disclaimer, the term of this patent is extended or adjusted under 35 U.S.C. 154(b) by 84 days.

(21) Appl. No.: 16/796,719

(22) Filed: Feb. 20, 2020

Related U.S. Application Data (63) Continuation of application No. 15/406,890, filed on Jan. 16, 2017, now Pat. No. 10,613,541.

(60) Provisional application No. 62/347,800, filed on Jun. 9, 2016, provisional application No. 62/295,977, filed on Feb. 16, 2016.

(51) Int. Cl.
*G05D 1/02* (2020.01)

(52) U.S. Cl.
CPC ........... *G05D 1/0219* (2013.01); *G05D 1/024* (2013.01); *G05D 1/0221* (2013.01); *G05D 1/0276* (2013.01)

(58) Field of Classification Search
None
See application file for complete search history.

(56) References Cited

U.S. PATENT DOCUMENTS

| | | | |
|---|---|---|---|
| 7,349,759 B2 | 3/2008 | Peless | |
| 9,026,302 B2 | 5/2015 | Stout | |
| 9,701,020 B1 | 7/2017 | Ebrahimi Afrouzi | |
| 10,207,408 B1 | 2/2019 | Ebrahimi Afrouzi | |
| 2008/0046125 A1 | 2/2008 | Myeong | |
| 2008/0249661 A1 | 10/2008 | Hong | |

(Continued)

FOREIGN PATENT DOCUMENTS

KR 20120116589 A * 10/2012 ........... G05D 1/0219

OTHER PUBLICATIONS

Jang; Machine translation of KR-20120116589-A; Oct. 2012; espacenet.com (Year: 2012).*

(Continued)

*Primary Examiner* — David P. Merlino (57) ABSTRACT

A method for covering a surface by a robotic device including: generating a two-dimensional map of a workspace using data from at least a depth measurement device positioned on the robotic device, dividing the two-dimensional map into a grid of cells, identifying the cells as free, occupied, or unknown, localizing the robotic device within the two-dimensional map, identifying at least one frontier within the map for exploration, generating a spanning tree such that a movement path of the robotic device includes a repetition of movement in a first direction along a straight line, 180 degree rotation over a distance perpendicular to the first direction, movement in a second direction opposite the first direction along a straight line, and 180 degree rotation over a distance perpendicular to the second direction, and recording the number of collisions incurred and the areas covered by the robotic device while executing the movement path.

18 Claims, 8 Drawing Sheets

(56) References Cited

U.S. PATENT DOCUMENTS

| | | | |
|---|---|---|---|
| 2009/0182464 A1 | 7/2009 | Myeong | |
| 2011/0125324 A1 | 5/2011 | Baek | |
| 2011/0167574 A1* | 7/2011 | Stout | G05D 1/0255 15/3 |
| 2013/0345922 A1 | 12/2013 | Biber | |
| 2015/0000068 A1* | 1/2015 | Tsuboi | A47L 9/19 15/319 |
| 2017/0131721 A1* | 5/2017 | Kwak | B25J 9/1664 |
| 2017/0261996 A1* | 9/2017 | Trehard | G05D 1/024 |
| 2018/0292223 A1* | 10/2018 | Leach | H04N 5/23216 |

OTHER PUBLICATIONS

Gabriely, Yoav; Spanning-Tree Based Coverage of Continuous Areas by a Mobile Robot; Israel Institute of Technology; Dec. 1999; http://biorobotics.ri.cmu.edu/papers/sbp_papers/integrated4/gabriely-spanning.pdf (Year:1999).

Choi, Young-Ho; Online Complete Coverage Path Planning for Mobile Robots Based on Linked Spatial Paths Using Constrained inverse Distance Transform; 2009; IEEE/RSJ International Conference on Intelligent Robots and Systems; p. 5788-5793; https://ieeexplore.ieee.org/abstract/document/5354499 (Year 2009).

Guruprasad, KR; ST-CTC: A Spanning Tree-based Competitive and Truly Complete Coverage Algorithm for Mobile Robots; Jul. 2015; Proceedings of the 2015 Conference on Advances in Robotics; https://dl.acm.org/citation.cfm?id=2783492 (Year:2015).

Lee, Tae-Kyeong; Smooth coverage path planning and control of mobile robots based on high-resolution grid map representation; Oct. 2011; Robotic and Autonomous Systems, v59 is 10, p. 801-812; https://www.sciencedirect.com/science/article/pii/S0921889011000996 (Year: 2011).

Galceran et al., "A survey on coverage path planning for robotics", Sep. 20, 2013, Elsevier, Robotics and Autonomous Systems, p. 1258-1276, https://www.sciencedirect.com/science/article/S092188901300167X (Year: 2013).

Choset, "Coverage for robotics—A survey of recent results", Oct. 2001, Annals of Mathematics and Artificial Intelligence, vol. 31, iss 1-4, p. 113-126, https://rd.springs com/article/10.1023/A:1016639210559 (Year: 2001).

Zelinsky et al., "Planning paths of complete coverage of an unstructured environment by a mobile robot", 1993, http://pinkwink.kr/attachment/cfile3 uf@1354654A4E8945BD13FE77.pdf (Year: 1993).

Huang, "Optimal line-sweep-based decomposition for coverage algorithms", Apr. 18, 2006, IEEE, International Conference on Robotics and Automation, p. 27-32, https://ieeexplore.ieee.org/abstract/document/932525 (Year: 2006).

Hazon et al., "Constructing spanning trees for efficient multi-robot coverage", Jun. 26, 2006, IEEE, International conference on robotics and automation, p. 1698-1703, https://ieeexplore.ieee.org/abstract/document/1641951 (Year: 2006).

* cited by examiner

SURFACE COVERAGE OPTIMIZATION METHOD FOR MOBILE ROBOTIC DEVICES

CROSS-REFERENCE TO RELATED APPLICATIONS

This application is a Continuation of U.S. Non-Provisional patent application Ser. No. 15/406,890, filed Jan. 16, 2017, which claims the benefit of U.S. Provisional Patent Application Nos. 62/295,977, filed Feb. 16, 2016 and 62/347,800, filed Jun. 9, 2016, each of which is hereby incorporated by reference.

FIELD OF THE DISCLOSURE

The disclosure relates to methods for creating and optimizing a surface coverage scheme for mobile robotic devices.

BACKGROUND

Robotic devices are being used with increasing frequency for jobs that require surface coverage. A robotic device may be used, for instance, for wiping windows, cutting grass, mopping floors, vacuuming floors, painting surfaces, etc. In all of these applications, the problem of surface coverage may be solved in different ways. In some cases, a boustrophedon pattern or other planned pattern is used. However, a preplanned path may not be very effective in dynamic environments or suitable for all different types of environments, for example, ones with many obstacles throughout the surface to be covered. A preplanned pattern could result in a robotic device performing an excessive number of rotations due to a high number of obstacles in an area. It may be preferable to use coverage schemes that minimize the number of rotations or turns that a robotic device makes as the number of turns may lengthen the amount of time needed to complete a job. Reducing the number of turns may also save energy. It may also be preferable to avoid retracing already covered surfaces so that time is not wasted covering area that has already been treated or worked on.

A need exists for a surface coverage scheme that more effectively deals with the above presented problems.

SUMMARY

Some embodiments include a method for covering a surface by a robotic device including: generating, with a processor of the robotic device, a two-dimensional map of a workspace using data from at least a depth measurement device positioned on the robotic device; dividing, with the processor, the two-dimensional map into a grid of cells; identifying, with the processor, the cells as free, occupied, or unknown; localizing, with the processor, the robotic device within the two-dimensional map; identifying, with the processor, at least one frontier within the map for exploration; generating, with the processor, a spanning tree including at least straight and leaf parts, such that a movement path of the robotic device along an outer edge of the spanning tree includes at least a repetition of movement in a first direction along a straight line, 180 degree rotation over a distance perpendicular to the first direction, movement in a second direction opposite the first direction along a straight line, and 180 degree rotation over a distance perpendicular to the second direction; and recording, with the processor, the number of collisions incurred and the areas covered by the robotic device while the robotic device executes the movement path during a work session.

Some embodiments provide a tangible, non-transitory, machine-readable medium storing instructions that when executed by a processor of a robotic device effectuates operations including: generating, with the processor, a two-dimensional map of a workspace using data from at least a depth measurement device positioned on a robotic device; dividing, with the processor, the two-dimensional map into a grid of cells; identifying, with the processor, the cells as free, occupied, or unknown; localizing, with the processor, the robotic device within the two-dimensional map; identifying, with the processor, at least one frontier within the map for exploration; generating, with the processor, a spanning tree including at least straight and leaf parts such that a movement path of the robotic device along an outer edge of the spanning tree includes at least a repetition of movement in a first direction along a straight line, 180 degree rotation over a distance perpendicular to the first direction, movement in a second direction opposite the first direction along a straight line, and 180 degree rotation over a distance perpendicular to the second direction; and recording, with the processor, the number of collisions incurred and the areas covered by the robotic device during execution of the movement path.

DETAILED DESCRIPTION OF SOME EMBODIMENTS

Some embodiments include a method for optimizing a coverage scheme for mobile robotic devices by devising and executing multiple coverage schemes and analyzing the results of each scheme.

In some embodiments, a mobile robotic device comprises, at minimum, a set of wheels for moving the machine, a motor to drive the wheels, a battery to power the machine, a central processing unit to devise a plurality of movement plans, a memory unit to store data regarding performance and past movement plans, and at least one sensor to sense at least one condition regarding performance.

Figure 1A:
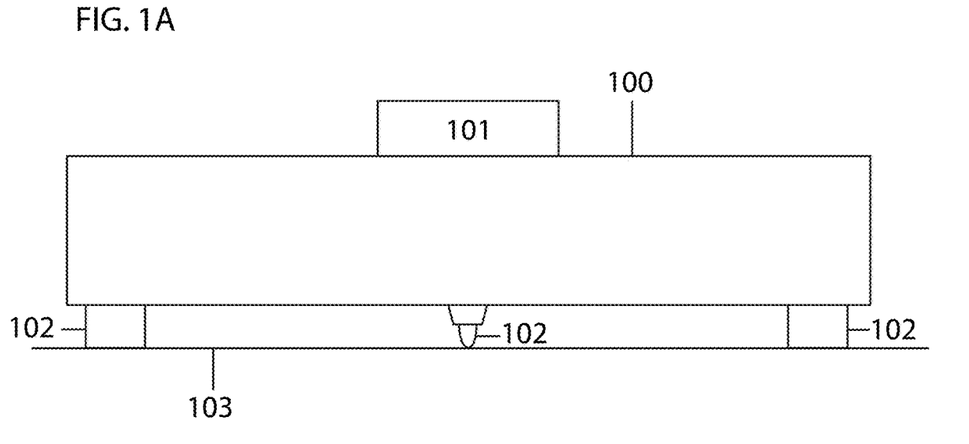
FIG. 1A illustrates a front elevation view of a robotic device embodying features of the present invention.
Figure 1B:
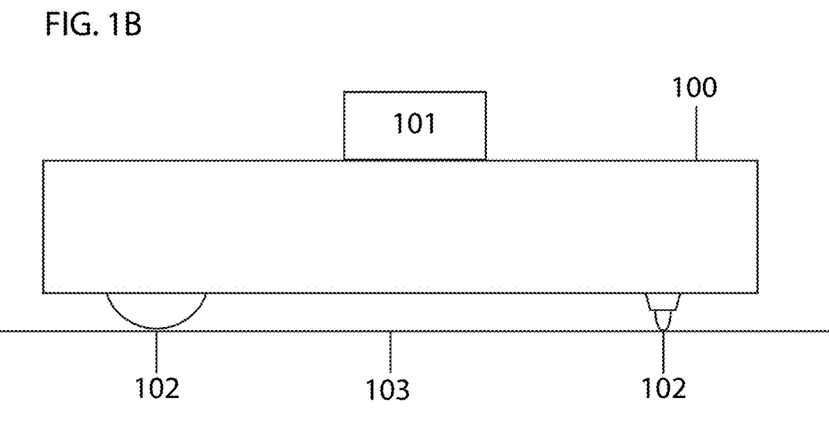
FIG. 1B illustrates a side elevation view of a robotic device embodying features of the present invention.

Throughout the process, a mobile robotic device uses a two-dimensional map of the workspace to develop a coverage scheme within that map. A map of the environment may be generated by the mobile robotic device with sensors using SLAM (simultaneous localization and mapping) or may be provided to the machine. In some embodiments, a laser rangefinder positioned on the mobile robotic device measures distances from the local mobile robotic device to obstacles in a plane parallel to the plane of the work surface in 360 degrees around the mobile robotic device. FIG. 1A illustrates a front view of a mobile robotic device 100 having a laser rangefinder 101 positioned on top of it. The mobile robotic device further comprises a set of wheels 102 and is shown positioned on a work surface 103. FIG. 1B illustrates a side view of mobile robotic device 100 with wheels 102 and laser rangefinder 101 on work surface 103. A two-dimensional map may be generated from the output data of the laser rangefinder.

Figure 2:
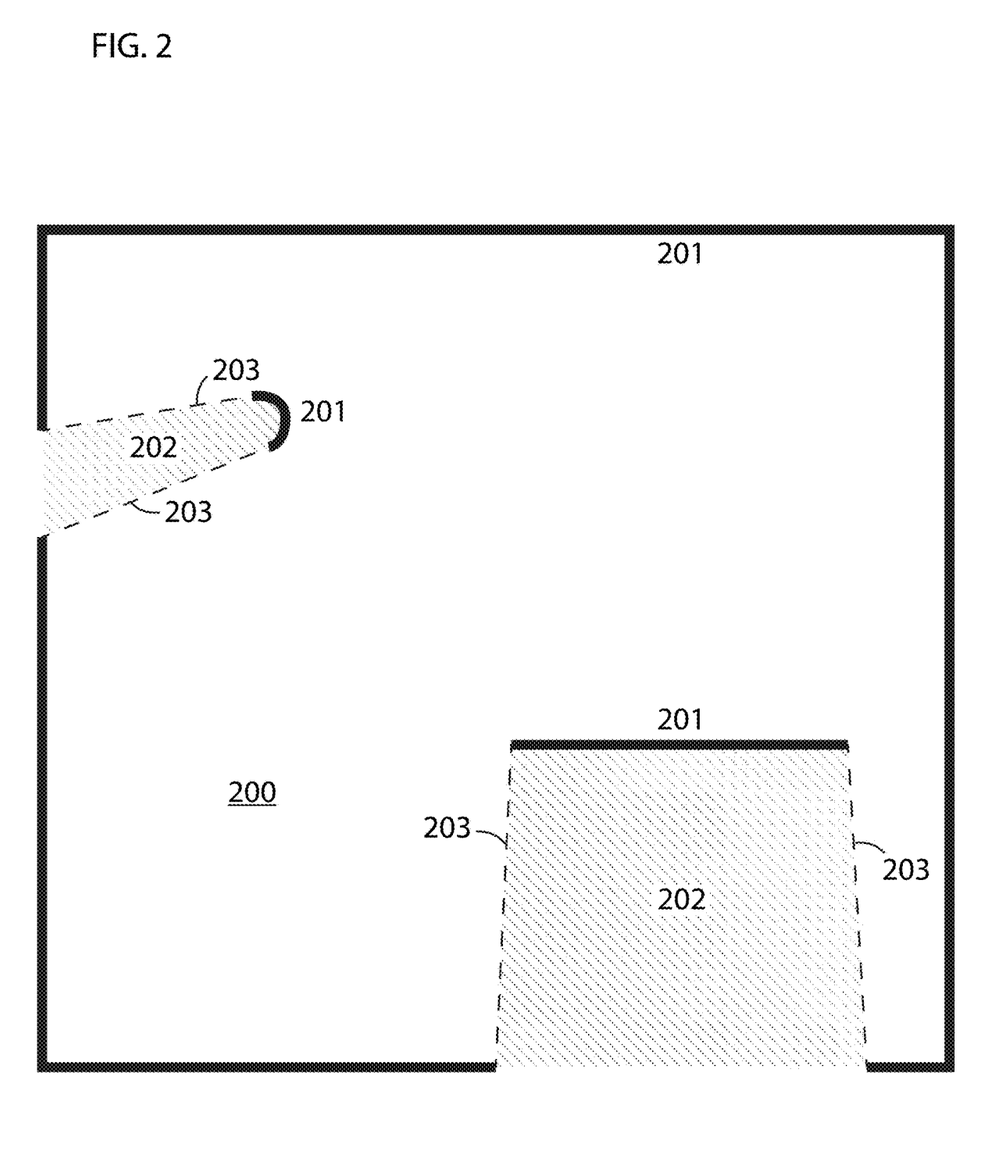
FIG. 2 illustrates an example of a map generated from outputs from a laser rangefinder positioned on a robotic device embodying features of the present invention.

In some embodiments, space within the map is marked free where no obstacles are present, occupied where obstacles are detected, or unknown, where the system has not determined whether obstacles are present or not. FIG. 2 illustrates an example of a map generated by the system. The white area 200 represents free space, the solid black lines/areas 201 represent detected obstacles, and the shaded areas 202 represent unknown space. Free space may be defined as those areas with no obstacles in them. Occupied space may be defined as those areas where the laser rangefinder detected an obstacle. Unknown space may be defined as areas where the laser rangefinder has not yet probed so the system does not know whether the area is free or occupied. In some embodiments, the system uses simultaneous localization and mapping SLAM methods to localize itself within the generated map.

Figure 3:
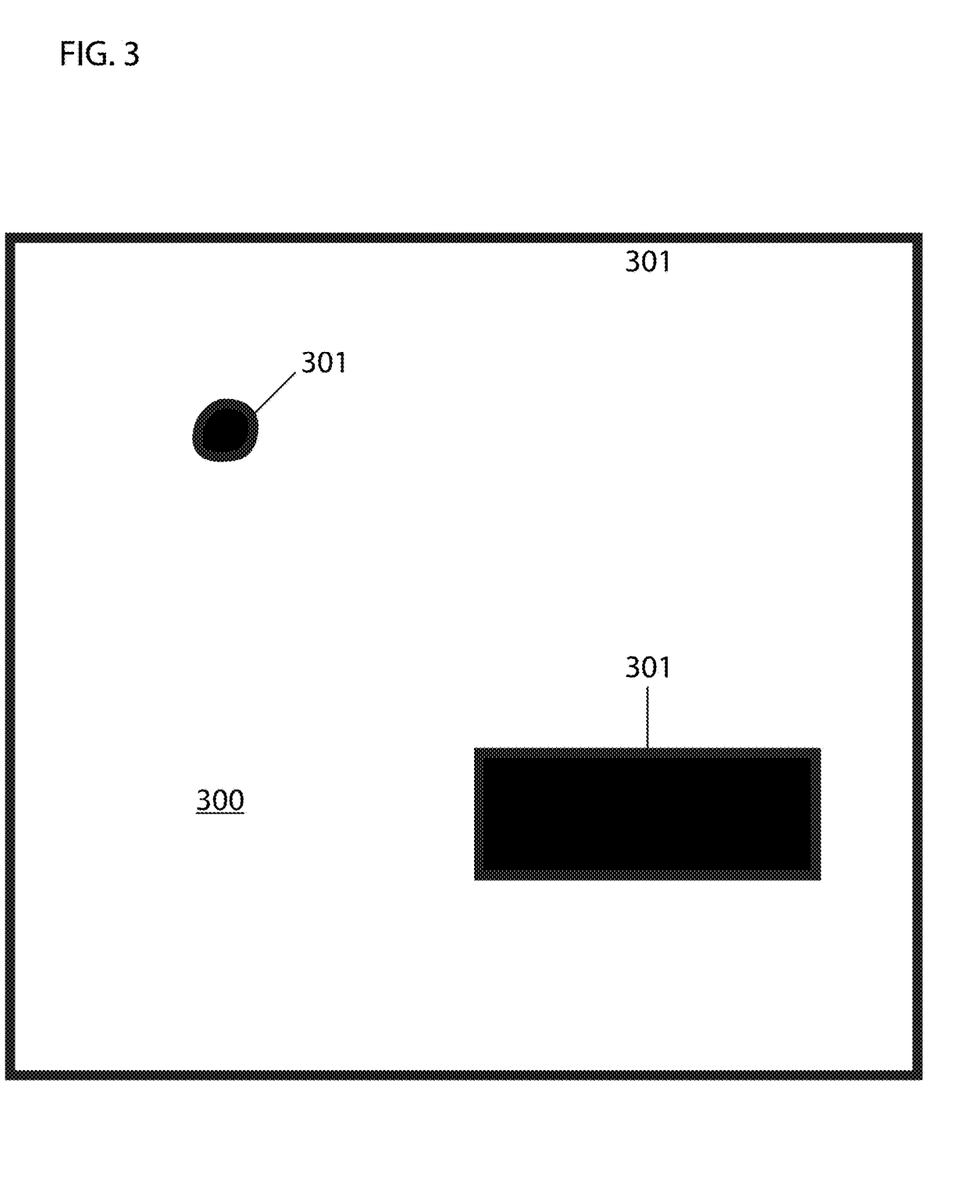
FIG. 3 illustrates an example of a completed map generated by outputs from a laser rangefinder positioned on a robotic device embodying features of the present invention.

In some embodiments, before proceeding, the mobile robotic device is configured to drive to all unknown areas to determine whether obstacles are present or not and mark the areas as either free or occupied. In some embodiments, this may be accomplished by identifying frontiers, wherein frontiers are defined as the borders between unknown space and areas that have been defined as occupied or free. In FIG. 2 the dashed lines 203 represent frontiers. The mobile robotic device is caused to drive to the frontiers where more data may be collected via the laser rangefinder to complete the map and convert unknown areas to either free or occupied space. In some embodiments, once substantially all frontiers in the map have been explored, the system proceeds to a coverage phase. FIG. 3 illustrates an example of a completed map. The solid black lines/areas 301 represent detected obstacles and white areas 300 represent free space.

In some embodiments, the free space is divided into a grid of predetermined cell size. In some embodiments, the axis of the grid is rotated until such a point as the maximum number of free cells result. In some embodiments, grid cells are approximately two times the width of the mobile robotic device or of a component thereof, for example, a vacuuming port.

Figure 4:
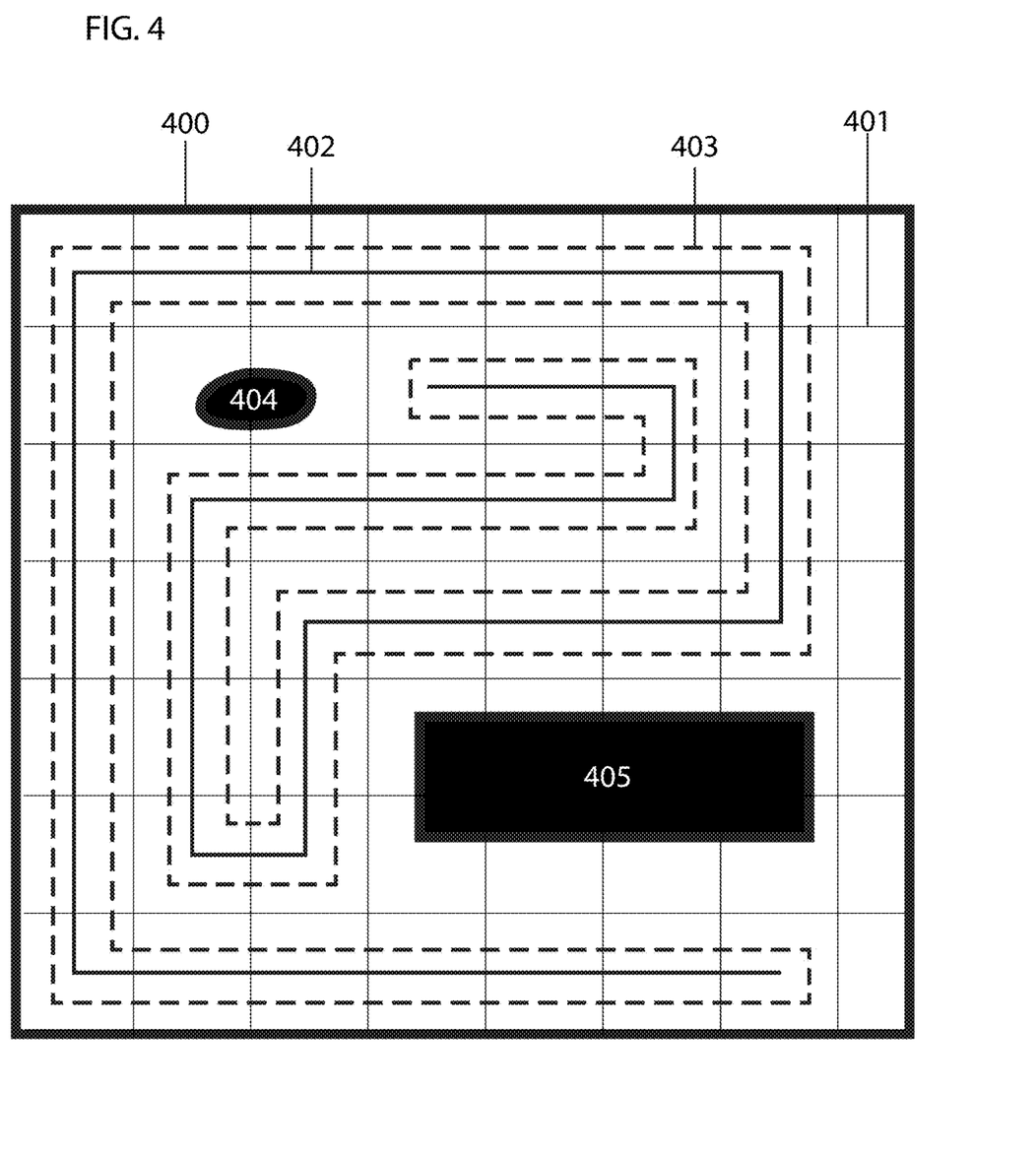
FIG. 4 illustrates an overhead view of a workspace and spanning tree and corresponding coverage path embodying features of the present invention.

In some embodiments, a first spanning tree is constructed within the grid by connecting the centers of all free cells in a loop-free graph tree. That is, none of the branches of the graph tree are connected, or looped together. Any grid cells that are marked unknown or partially free and partially occupied may be discarded. FIG. 4 illustrates a map 400 is divided into a grid 401. The solid line 402 represents a spanning tree. The dashed line 403 shows the path that a mobile robotic device would follow around the outside of the spanning tree 402. The black areas 404, 405 represent occupied space.

Figure 5A:
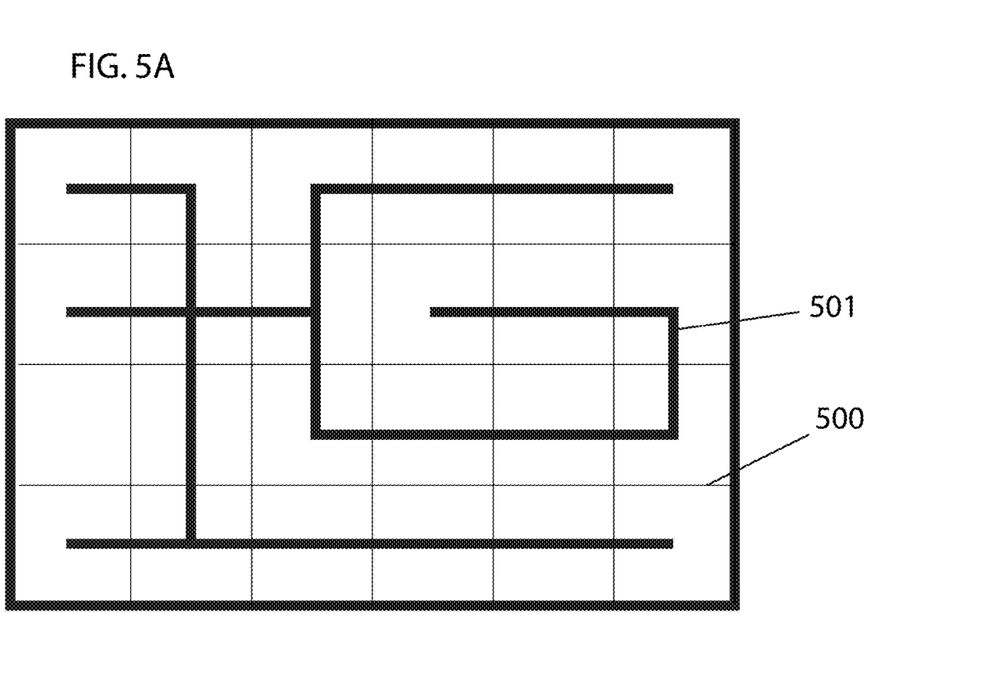
FIG. 5A illustrates an overhead view of a workspace and spanning tree embodying features of the present invention.
Figure 5B:
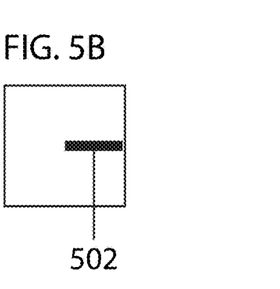
FIG. 5B illustrates a portion of a spanning tree called a leaf embodying features of the present invention.
Figure 5C:
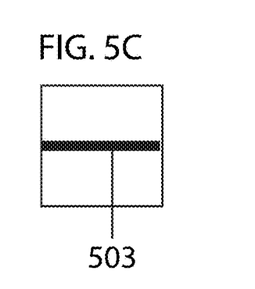
FIG. 5C illustrates a portion of a spanning tree called a straight embodying features of the present invention.
Figure 5D:
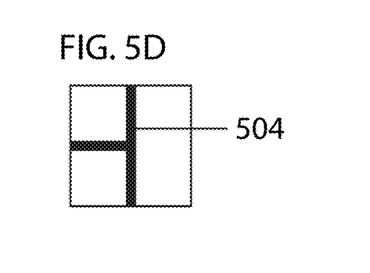
FIG. 5D illustrates a portion of a spanning tree called a T embodying features of the present invention.
Figure 5E:
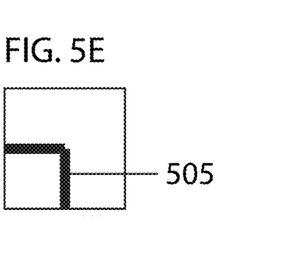
FIG. 5E illustrates a portion of a spanning tree called a bend embodying features of the present invention.
Figure 5F:
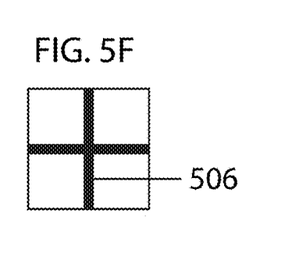
FIG. 5F illustrates a portion of a spanning tree called a plus embodying features of the present invention.
Figures 6A, 6B:
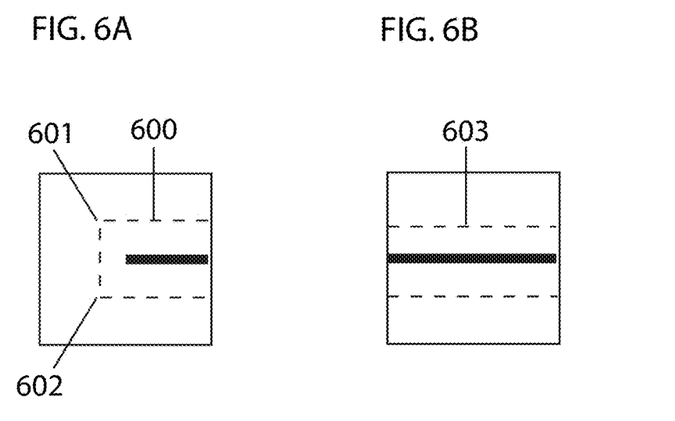
FIG. 6A illustrates the path resulting from following the outer edge of a leaf embodying features of the present invention.
FIG. 6B illustrates the path resulting from following the outer edge of a straight embodying features of the present invention.
Figure 6C:
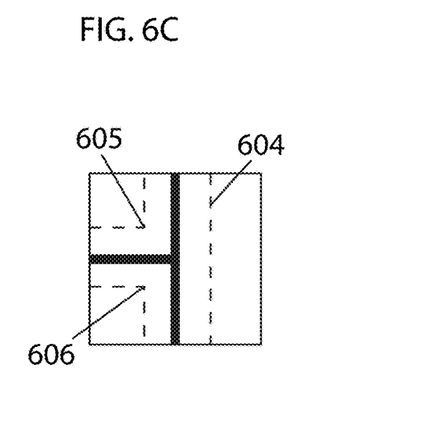
FIG. 6C illustrates the path resulting from following the outer edge of a T embodying features of the present invention.
Figure 6D:
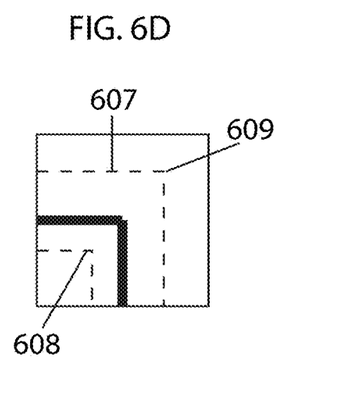
FIG. 6D illustrates the path resulting from following the outer edge of a bend embodying features of the present invention.
Figure 6E:
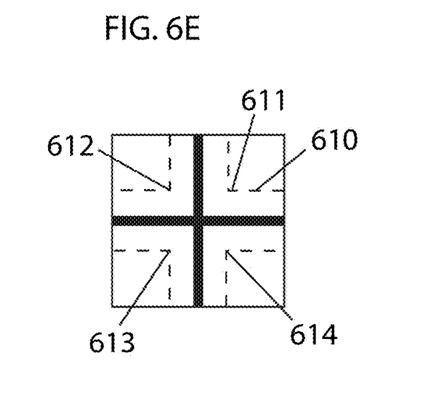
FIG. 6E illustrates the path resulting from following the outer edge of a plus embodying features of the present invention.
Figure 7A:
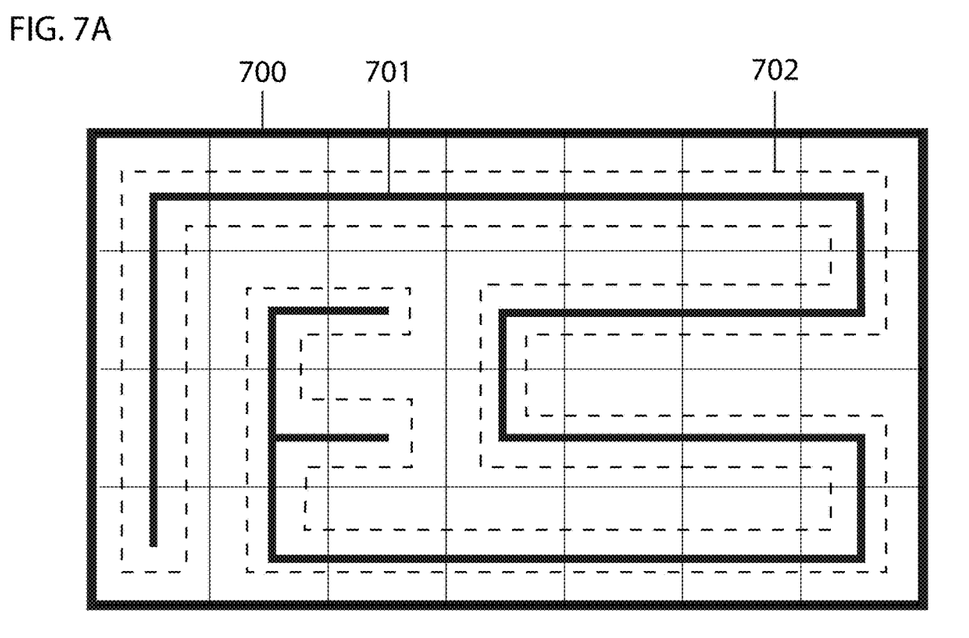
FIG. 7A illustrates an overhead view of a workspace and non-optimized spanning tree and corresponding coverage path embodying features of the present invention.
Figure 7B:
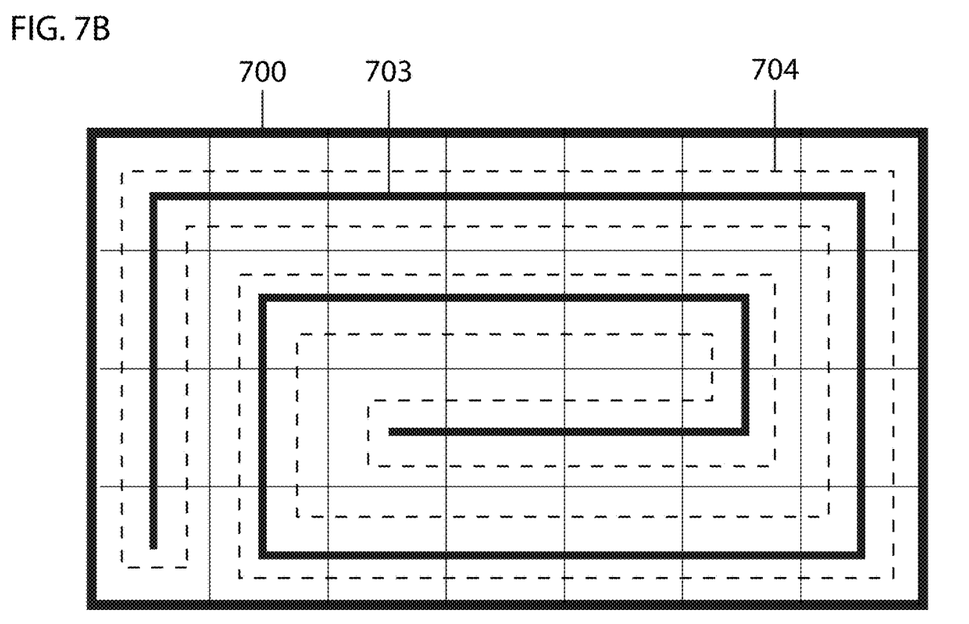
FIG. 7B illustrates an overhead view of a workspace and optimized spanning tree and corresponding coverage path embodying features of the present invention.

In some embodiments, spanning trees are constructed in such a way as to minimize the number of corners or turns found in a path resulting from following the outside edge of the spanning tree. This may be accomplished by analyzing each part of the spanning tree cell by cell. FIG. 5A illustrates a grid 500 and spanning tree 501. The spanning tree is composed of various parts illustrated in FIGS. 5B-5F. The spanning tree part 502 shown in FIG. 5B shall be referred to as a 'leaf'. The spanning tree part 503 shown in FIG. 5C shall be referred to as a 'straight'. The spanning tree part 504 shown in FIG. 5D shall be referred to as a 'T'. The spanning tree part 505 shown in FIG. 5E shall be referred to as a 'bend'. The spanning tree part 506 shown in FIG. 5F shall be referred to as a 'plus'. FIGS. 6A-6E illustrate the paths corresponding to following the outer edges of each part of a spanning tree. FIG. 6A shows the path 600 resulting from following the edge of a leaf. A leaf produces a path with two corners 601, 602. FIG. 6B shows the path 603 resulting from following the edge of a straight. A straight produces a path with no corners. FIG. 6C shows the path 604 resulting from following the edge of a T. A T produces a path with two corners 605, 606. FIG. 6D shows the path 607 resulting from following the edge of a bend. A bend produces a path with two corners 608, 609. FIG. 6E shows the path 610 resulting from following the edge of a plus. A plus produces a path with four corners 611, 612, 613, 614. To optimize the spanning tree, trees will be constructed with the smallest number of corners in the path that results from following the outside edge of the spanning tree. By following this policy, spanning tree parts that create fewer corners would be used in favor of spanning tree parts that create more corners when possible. FIG. 7A illustrates a workspace 700 with spanning tree 701 and resulting path 702. This path contains 26 corners. FIG. 7B illustrates the same grid 700 is shown with an optimized spanning tree 703. The resulting path 704 has only 18 corners because fewer parts that create corners are used.

Figure 8:
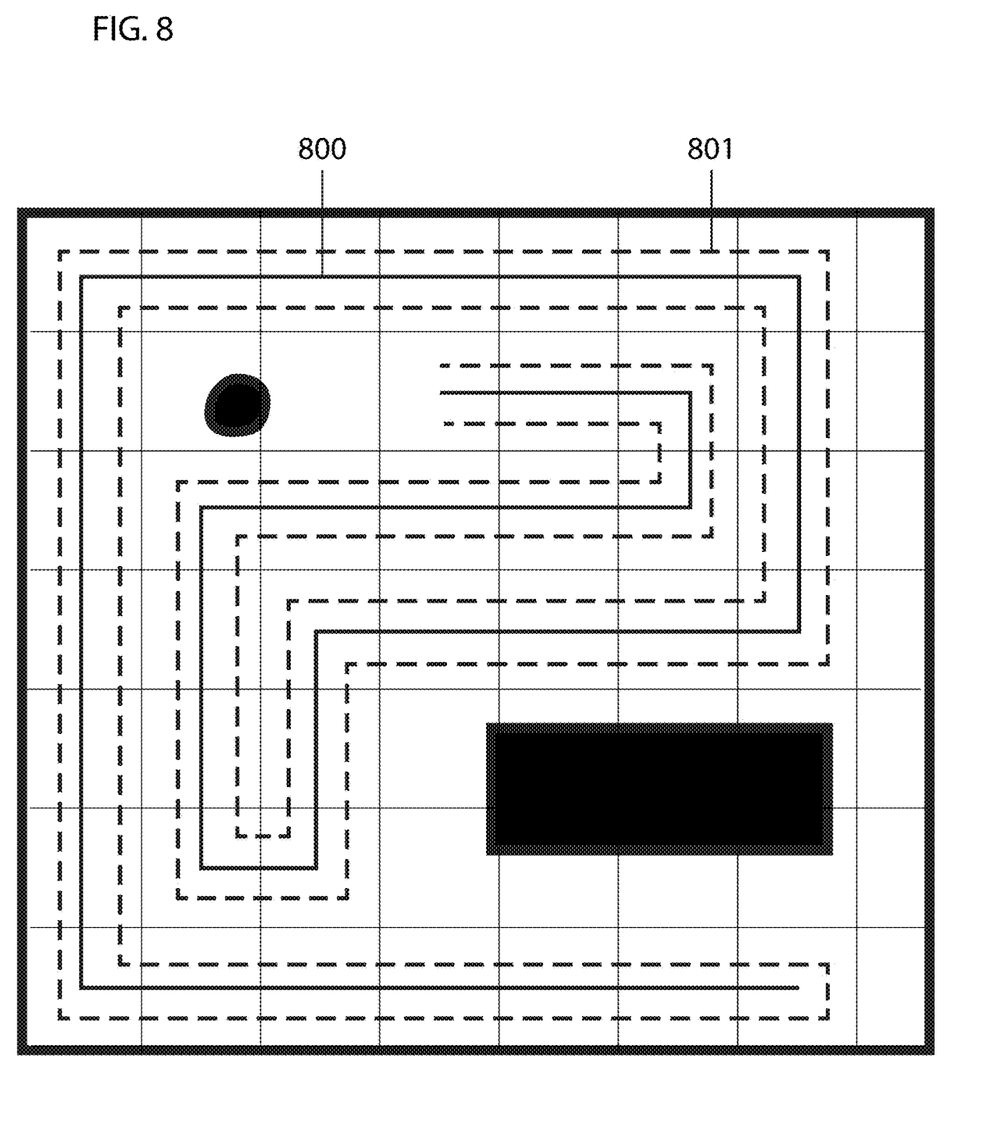
FIG. 8 illustrates an example of a map divided into cells and a spanning tree within the cells embodying features of the present invention.

FIG. 8 illustrates another example of a completed map divided into a grid. The solid line 800 represents a spanning tree. In some embodiments, the spanning tree is constructed in such a way as to minimize the number of corners or turns found in a path resulting from following the outside edge of the spanning tree. The path along the outside edge of the spanning tree is shown in the example by the dashed line 801. The mobile robotic device is caused to drive along the path. Driving on the path causes the mobile robotic device to cover each portion of a cell only once if the cells are twice the width of mobile robotic device (or a servicing tool thereof).

In some embodiments, as the mobile robotic device drives, the system saves the coordinates of the cells covered for use in the event of an interruption of work. For example, if the mobile robotic device must stop work to recharge, the system can direct the mobile robotic device to the location of the last covered cell coordinates when the mobile robotic device is ready to restart.

In some embodiments, in the event of an unmapped obstacle blocking the path of the mobile robotic device, the system resorts to what shall be referred to hereinafter as snake pattern. In snake pattern, the mobile robotic device simply turns from the encountered obstacle 90 degrees in a left or right direction, drives straight until the next obstacle, then turns 90 degrees in a direction opposite of the last turning direction, drives straight until the next obstacle, and repeats this pattern until running out of space to continue the pattern.

In some embodiments, the coverage scheme may be combined with wall-following methods to ensure thorough coverage of the edges of the map.

In some embodiments, the mobile robotic device is caused to drive along the outside edge of the spanning tree. While driving on the path, the mobile robotic device monitors performance in various ways. In some embodiments, the mobile robotic device includes at least one touch sensor to detect collisions, and the system counts the number of collisions incurred during each job or work session. In some embodiments, the system also monitors the amount of area retraced (covered more than once) and the amount of area left uncovered (if any) by the mobile robotic device. In some embodiments, the system monitors the amount of time to complete the entire path. In some embodiments, upon completion of the path, the monitored parameters are saved into a database and associated with the particular spanning tree used that produced them. In some embodiments, the value of the particular spanning tree used may be quantified by using a positive and negative rewards system.

For example, each time a touch sensor detects a collision, a negative reward is assigned to the spanning tree in use. In a like manner, negative rewards are also assigned for area retraced, area left uncovered, and time to complete the job, the amount of reward in each case being greater as deviation from a predefined ideal increases. In some embodiments, upon completion of the job, a large positive reward is assigned to the spanning tree to incentivize the mobile robotic device to complete the job in spite of the negative rewards incurred throughout the job.

In some embodiments, the system creates a new spanning tree for each new job for a first predetermined number of jobs, each new spanning tree with at least some variations from the previously used spanning trees. In this way, the system would gain performance data about various surface coverage patterns.

Execution of each action (movement in any direction) results in the transition from a first state to a next state. The reward (R) of each state (s) may be represented by:

$$R_{(s)}=R_{(ts)}\gamma^t$$

Wherein t is discrete time and γ is a discount factor. A discount factor is included to account for inherent increased likelihood of redundancy as a particular job approaches completion. When a mobile robotic device begins a new work session, it will not retrace any area at first because no area has already been covered. As the device covers more area, the likelihood of retracing already covered areas increases because the area already covered increases.

The reward after the transition from state (s) to (s') may be represented by:

$$R_{(s')}=R_{(ts)}\gamma^t+R_{(ts+1)}\gamma^{t+1}$$

The cumulative rewards over the course of a work session are combined to determine the payoff of the particular spanning tree used. The total reward for work in a session can be represented by:

$$R_{(t0)}\gamma^t+R_{(t1)}\gamma^t+R_{(t2)}\gamma^t+R_{(t3)}\gamma^t+\ldots+R_{(tn)}\gamma^t=\text{Total reward}$$

The system may be configured to attempt to maximize this value at all times, which is represented by the formula:

$$E[\Sigma\gamma^tR_t]\to\text{Max}$$

Where E is the expectation that R (reward) is maximized. Therefore, the value of state (s) when policy (π) is executed equals the expected sum of all future discounted rewards provided that the initial state ($s_0$) is (s) and policy (π) is executed as represented by the formula:

$$_{(s)}{}^\pi V=E_t[\Sigma\gamma_tR_t|s_0=s]$$

From the above, a value iteration may be concluded:

$$V_{(s)}=[\max_{a_s}\gamma\Sigma P(s|s,a)V_{(s')}]+R_{(s)}$$

Where:
$\max_a$=maximizing action
$V_{(s')}$=value of successor
$R_{(s)}$=reward or cost to get to state s
P=state transition function
R=reward function The above formula is found after convergence according to Bellman's equation represented by the formula:

$$\max\sum_{t=0}^{\infty}\beta^t\mu(c_t)$$

$$a_{t+1}=(1+r)(a_t-c_t),\ c_t\geq 0,\text{ and}$$

$$\lim_{t\to\infty} a_t \geq 0,$$

and $$V(a)=\max\{\mu(c)+\beta V((1+r)(a-c))\}$$

The value of a given state depends on the outcome of the prior state multiplied by the cost (penalty incurred) to get there. The system can then compare the value of the particular spanning tree used in each work session and determine which spanning tree produced the best results (and thereby has the highest value). As the system completes more and more sessions, each with different spanning trees, more and more data is gathered and values are assigned to each state. That is, a value is assigned to each spanning tree used. Once values have been assigned to spanning trees, the system can calculate a policy to maximize rewards. The system develops a policy, which defines the best spanning tree yet discovered. This is represented by the formula, $$\pi(s) = \operatorname*{argmax}_{s'} \sum P(s' \mid s_1 a) V(s')$$

From value iteration methods one may find policy 1, which is a better policy than policy 0, and then find a policy 2, which is a better than policy 1, and so on. The above formula therefore finds the best eventual policy.

Pa (s,s')=Pr(st+1=s'|st=s, at=a) is the probability that action a in state s at time t will lead to state s' at time t+1

And $R_a(s,s')$ is the immediate reward received after transition to state s' from s And $\gamma \in [0,1]$ is the discount factor.

A desirable outcome is to choose a policy, π, that will maximize the expected discounted sum of the rewards collected at any given S. The system uses the policy π to select the best known spanning tree with which to cover the workspace.

In this method, S (state) refers to the state of the device after each action (movement in any direction). A finite number of actions are possible, and thus there are a finite number of resulting states. A is the action selected, which takes the device from state S to state S'.

The invention claimed is:

1. A method for covering a surface by a robotic device comprising:
   generating, with a processor of the robotic device, a two-dimensional map of a workspace using data from at least a depth measurement device positioned on the robotic device;
   dividing, with the processor, the two-dimensional map into a grid of cells;
   identifying, with the processor, the cells as free, occupied, or unknown;
   localizing, with the processor, the robotic device within the two-dimensional map;
   identifying, with the processor, at least one frontier within the map for exploration;
   generating, with the processor, a spanning tree comprised of at least straight and leaf parts, such that a movement path of the robotic device along an outer edge of the spanning tree comprises at least a repetition of movement in a first direction along a straight line, 180 degree rotation over a distance perpendicular to the first direction, movement in a second direction opposite the first direction along a straight line, and 180 degree rotation over a distance perpendicular to the second direction;
   recording, with the processor, the number of collisions incurred and the areas covered by the robotic device while the robotic device executes the movement path during a work session; and
   determining, with the processor, a value metric of the movement path based on collisions with obstacles, areas retraced by the robotic device during the work session, areas left uncovered at the end of the work session, and an amount of time taken to complete the work session.

2. The method of claim 1, further comprising:
   saving, with the processor, at least a last known location of the robotic device during the work session immediately prior to the work session being interrupted; and
   instructing, with the processor, the robotic device to resume the work session from the at least the last known location saved.

3. The method of claim 2, wherein the robotic device interrupts the work session to recharge and resumes the work session after recharging.

4. The method of claim 1, further comprising:
   detecting, with the processor, an unmapped obstacle blocking the movement path of the robotic device; and
   altering, with the processor, the movement path to avoid collision with the obstacle.

5. The method of claim 1, wherein the robotic device executes a wall-follow movement path after executing at least a portion of the movement path.

6. The method of claim 1, wherein an increase in any of: the number of collisions, areas retraced by the robotic device during the work session, areas left uncovered at the end of the work session, and the amount of time taken to complete the work session decreases the value metric of the movement path.

7. The method of claim 1, wherein the processor generates the movement path based on historical value metrics of movement paths.

8. The method of claim 7, wherein the processor generates a new movement path during each of a predetermined number of work sessions prior to generating the movement path based on the historical value metrics of movement paths.

9. The method of claim 1, wherein the processor optimizes the movement path of the robotic device over time based on historical value metrics of movement paths.

10. A tangible, non-transitory, machine-readable medium storing instructions that when executed by a processor of a robotic device effectuates operations comprising:
   generating, with the processor, a two-dimensional map of a workspace using data from at least a depth measurement device positioned on the robotic device;
   dividing, with the processor, the two-dimensional map into a grid of cells;
   identifying, with the processor, the cells as free, occupied, or unknown;
   localizing, with the processor, the robotic device within the two-dimensional map;
   identifying, with the processor, at least one frontier within the map for exploration;
   generating, with the processor, a spanning tree comprised of at least straight and leaf parts such that a movement path of the robotic device along an outer edge of the spanning tree comprises at least a repetition of movement in a first direction along a straight line, 180 degree rotation over a distance perpendicular to the first direction, movement in a second direction opposite the first direction along a straight line, and 180 degree rotation over a distance perpendicular to the second direction;
   recording, with the processor, the number of collisions incurred and the areas covered by the robotic device during execution of the movement path; and
   determining, with the processor, a value metric of the movement path based on at least collisions with obstacles, areas retraced by the robotic device during a work session, areas left uncovered at the end of the work session, and an amount of time taken to complete the work session.

11. The medium of claim 10, wherein the operations further comprise:
   saving, with the processor, at least a last known location of the robotic device during a work session immediately prior to the work session being interrupted; and
   instructing, with the processor, the robotic device to resume the work session from the at least the last known location saved.

12. The medium of claim 11, wherein the robotic device interrupts the work session to recharge and resumes the work session after recharging.

13. The medium of claim 10, wherein the operations further comprise:
   detecting, with the processor, an unmapped obstacle blocking the movement path of the robotic device; and
   altering, with the processor, the movement path to avoid collision with the obstacle.

14. The medium of claim 10, wherein the robotic device executes a wall-follow movement path after executing at least a portion of the movement path.

15. The medium of claim 10, wherein an increase in any of: the number of collisions, the areas retraced by the robotic device during the work session, the areas left uncovered at the end of the work session, and the amount of time taken to complete the work session decreases the value metric of the movement path.

16. The medium of claim 10, wherein the processor generates the movement path based on historical value metrics of movement paths.

17. The medium of claim 16, wherein the processor generates a new movement path during each of a predetermined number of work sessions prior to generating the movement path based on the historical value metrics of movement paths.

18. The medium of claim 10, wherein the processor optimizes the movement path of the robotic device over time based on historical value metrics of movement paths.

* * * * *